United States Patent [19]

Johnson

[11] Patent Number: 4,534,871

[45] Date of Patent: Aug. 13, 1985

[54] LUBRICANT INSERT FOR ROLLING BEARINGS

[75] Inventor: John H. Johnson, Wayne, Pa.

[73] Assignee: SKF Industries, Inc., King of Prussia, Pa.

[21] Appl. No.: 370,514

[22] Filed: Apr. 21, 1982

Related U.S. Application Data

[63] Continuation of Ser. No. 133,404, Mar. 24, 1980, abandoned.

[51] Int. Cl.$^3$ ............................................... C10M 5/00
[52] U.S. Cl. ..................... 252/12; 252/12.2; 384/463
[58] Field of Search ............... 252/12, 12.2; 308/240

[56] References Cited

U.S. PATENT DOCUMENTS

| | | | |
|---|---|---|---|
| 2,038,010 | 4/1936 | Smith | 384/481 |
| 2,326,161 | 8/1943 | Nelson | 384/469 |
| 2,457,537 | 12/1948 | Douglass | 384/471 |
| 2,897,024 | 7/1959 | Chenea | 384/470 |
| 3,073,656 | 1/1963 | Tann | 384/465 |
| 3,135,564 | 6/1964 | Agens | 384/470 |
| 3,250,580 | 5/1966 | Sikura | 384/477 |
| 3,252,905 | 5/1966 | Schaeffer | 252/12 |
| 3,424,273 | 1/1969 | Carlson et al. | 184/98 |
| 3,541,011 | 11/1970 | Davis et al. | 252/12 |
| 3,547,819 | 12/1970 | Davis et al. | 252/12 |
| 3,645,066 | 2/1972 | Flandrena | 53/509 |
| 3,729,415 | 4/1973 | Davis et al. | 252/12 X |
| 3,882,030 | 5/1975 | Campbell et al. | 252/12 |
| 3,926,818 | 12/1975 | Albertson et al. | 252/12 X |
| 3,975,066 | 8/1976 | Hofmann et al. | 384/526 |
| 3,985,660 | 10/1976 | Lankamp | 252/12 |
| 4,134,842 | 1/1979 | Orkin et al. | 252/12 X |
| 4,146,487 | 3/1979 | Rumierz | 252/12 |

FOREIGN PATENT DOCUMENTS 833847  5/1960  United Kingdom .

*Primary Examiner*—William R. Dixon, Jr.
*Assistant Examiner*—Cynthia A. Prezleck
*Attorney, Agent, or Firm*—Eugene E. Renz, Jr.

[57] ABSTRACT

A lubricant insert for lubricating rolling bearings composed of a firm, tough, solid gel matrix containing a lubricating oil of lubricating viscosity which exudes therefrom to provide an oily surface in contact with the elements of the bearing. The preferred form of lubricant insert comprises an annular member having a plurality of circumferentially spaced axially directed projections which have surfaces conforming to the contour of the rolling elements and which are of a predetermined orientation to permit ease of assembly and locking of the insert in place in the annular space between the inner and outer rings of the bearing.

5 Claims, 17 Drawing Figures

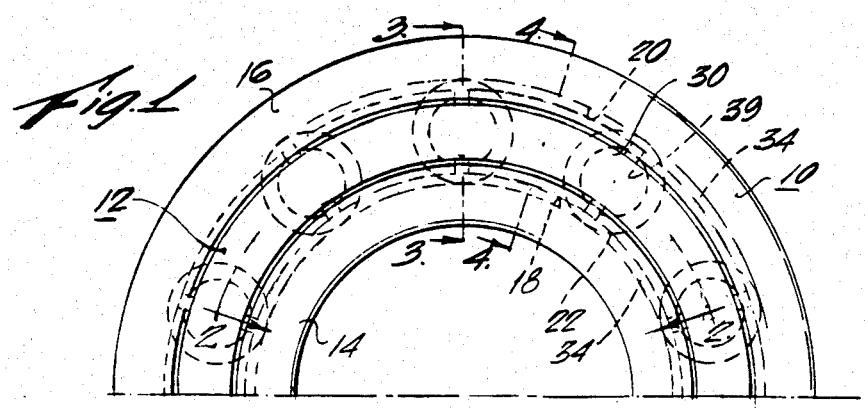
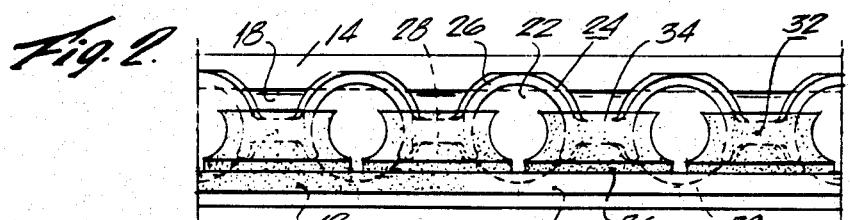
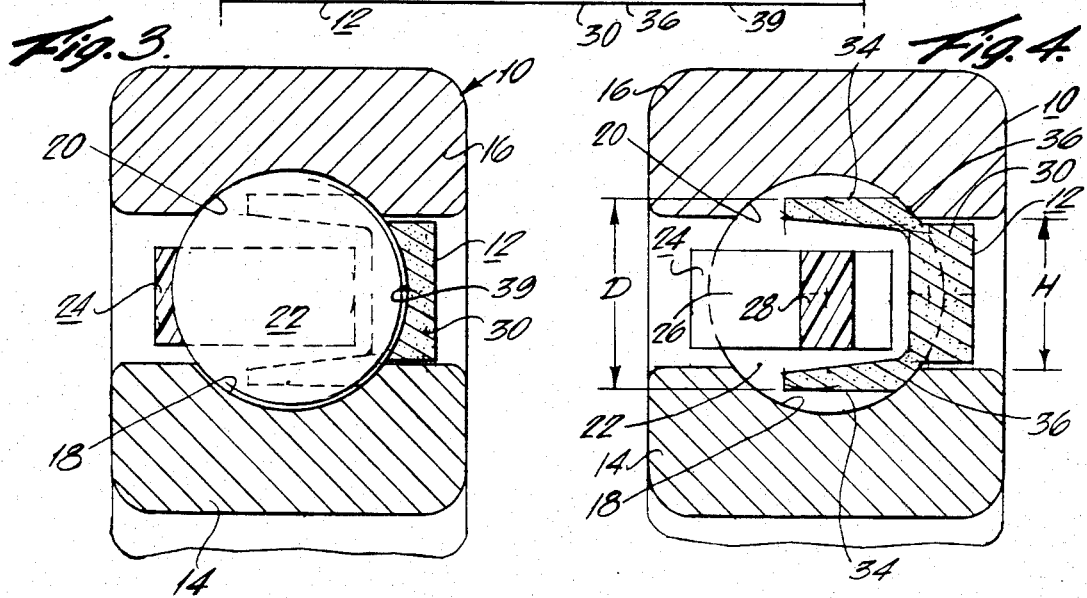
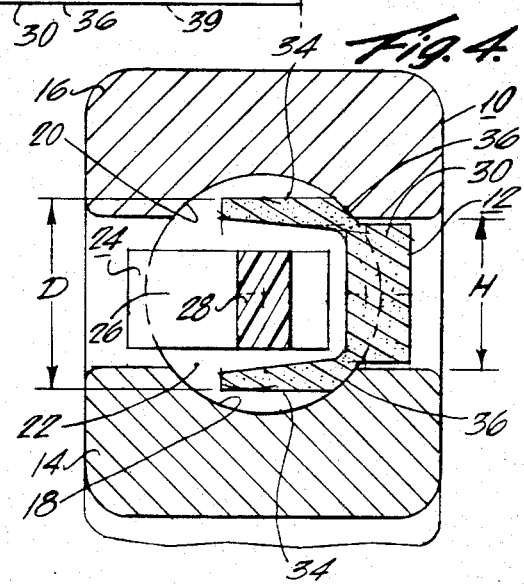
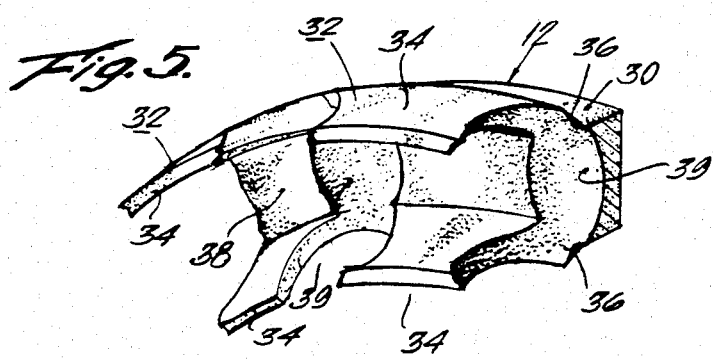

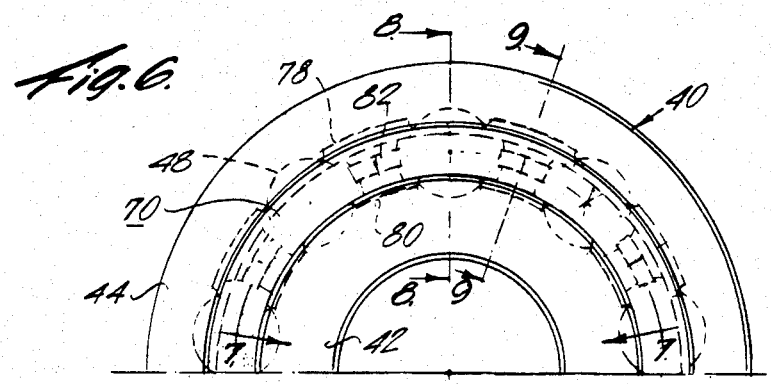
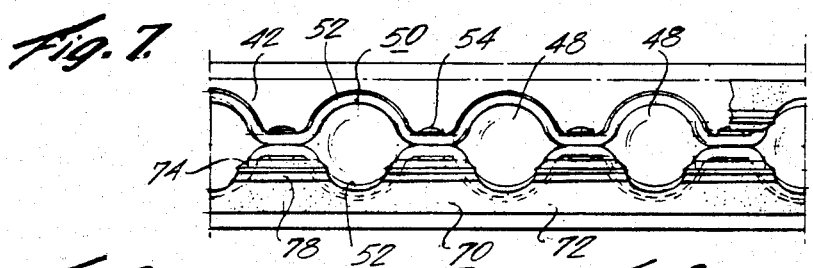
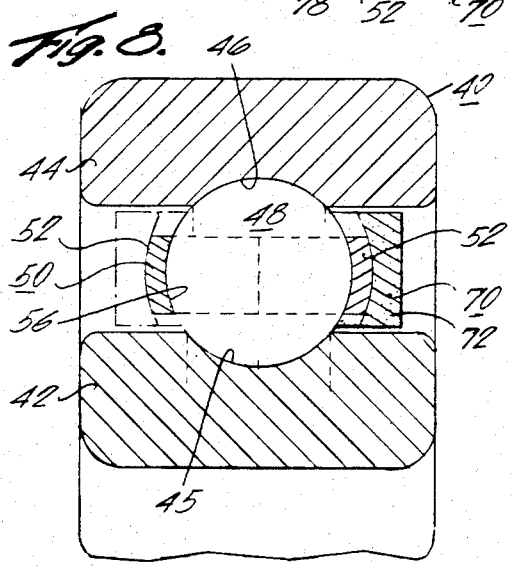
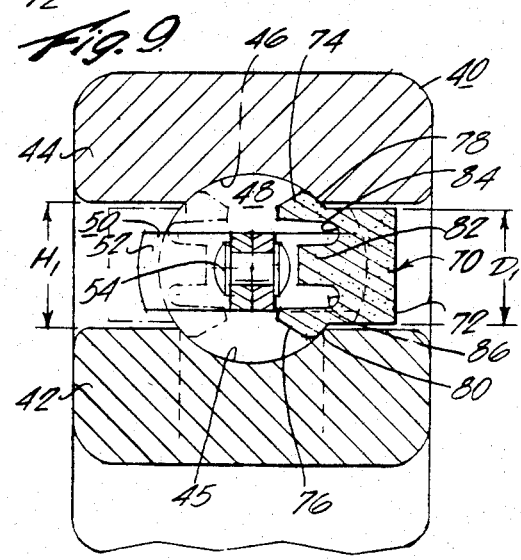
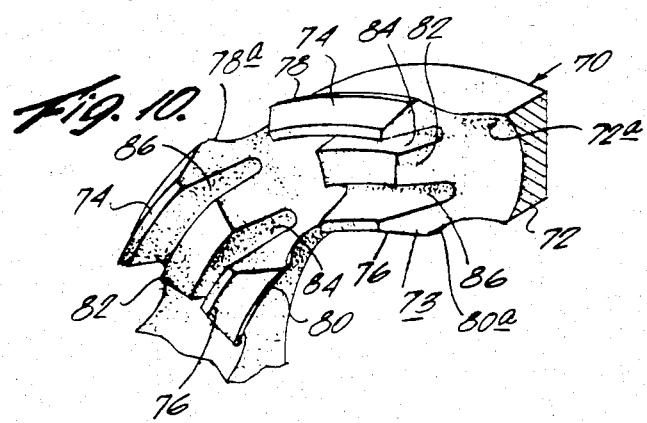

LUBRICANT INSERT FOR ROLLING BEARINGS

This is a continuation, of application Ser. No. 133404 filed Mar. 24, 1980 now abandoned.

BACKGROUND OF THE INVENTION

It has long been recognized that it would be highly desirable in many industries and arts to provide rolling bearings provided with means for positive and reliable lubrication and in which such lubricating means are also quickly and easily replaced as necessary with a minimum loss of operating time. Many attempts to achieve such rolling bearings have been suggested previously but none has met all of the desired criteria. For example, it has been suggested previously to employ removable articles containing lubricant which are held in place in the bearing by various types of cage structures. Heretofore, such lubricating articles have either been relatively difficult to remove and replace or they have not been entirely satisfactory in providing positive and reliable lubrication. Another suggestion of the prior art has been to fill the entire void in the bearing with a lubricant, either a fluid in a sealed bearing or, more recently, a lubricant filled into the void of the bearing and gelled in situ therein to provide a self-supporting lubricant mass not requiring a seal to hold it in place. Such self-supporting gels formed in situ in the bearing are a significant advance in the art. Although they too have certain disadvantages such as the difficulty of controlling the location, extent and pressure of contact of the gel lubricant with the surfaces to be lubricated, and the tendency of some such gels to adhere to the interior of the bearing and actually hinder or prevent the operation of the bearing. Therefore, a need remains in the art for an easily replaceable lubricating insert which provides positive, precise and reliable contact with and lubrication of the desired bearing surfaces.

It is a primary object of the present invention, therefore, to provide novel lubricant inserts to rolling bearings which are easily and quickly removed and replaced as necessary and which provide positive and precisely predetermined contact with the surfaces to be lubricated so as to provide reliable lubrication thereof.

It is another object of the invention to provide novel structures for retaining lubricating inserts in a rolling bearing in precise lubricating contact with the surfaces to be lubricated.

It is still another object of the invention to provide lubricating inserts in the form of precision-shaped gel lubricating masses formed outside of the bearing structure but shaped to fit into the bearing with precise location and effective lubricating contact.

SUMMARY OF THE INVENTION

The foregoing and other objects of the invention, which will become apparent hereinafter, are attained by providing self-supporting gel lubricant inserts having novel structures for positioning and retaining the inserts in rolling bearings in such a way that they provide precise contact with the surfaces to be lubricated and positive and reliable lubrication thereof and yet are capable of being quickly and easily removed from the bearing and replaced as necessary with a minimal loss of operating time.

More specifically, the novel rolling bearing lubricant inserts are of one-piece design and have novel structures adapted to seat in and engage the inner and outer raceways of a rolling bearing to lock the insert in place. An inner face of an annular member of the insert is provided with a spherical seat or cut-out portion conforming to the contour of the ball or other rolling element so that the rolling element picks up lubricant from the insert and delivers it to the contact zones of the raceways during operation. Inner and outer faces of the insert conform to the race surfaces and thereby transfer lubricant directly.

The lubricant inserts are composed of tough, solid gels, containing lubricating oil, which are self-supporting and which are precision shaped to fit into and be retained by the rolling bearings in such a way that the lubricating gel is in contact with the bearing internal surfaces and rolling elements so that lubricant bleeding from the self-supporting gel is positively and reliably applied to the bearing as it turns. The bearings may be of any type including without limitation, ball bearings, tapered roller bearings, cylindrical roller bearings and other known types.

The lubricant inserts are primarily or entirely composed of self-supporting, firm, tough, solid gels having an oily surface provided by oil exuding from the gel. Suitable materials of this type are disclosed in Davis et al U.S. Pat. No. 3,541,011 issued Nov. 17, 1970; Davis et al U.S. Pat. No. 3,547,819 issued Dec. 15, 1970; Davis et al U.S. Pat. No. 3,729,415 issued Apr. 24, 1973; and Rumierz U.S. Pat. No. 4,146,487 issued Mar. 27, 1979, the entire disclosures of which patents are incorporated herein by reference. All of these patents disclose lubricating compositions comprising a hydrocarbon oil and a polyolefin polymer which forms a gel providing a matrix for the lubricating oil. The three Davis et al U.S. patents disclose and provide practical examples of polyethylene gels. Davis et al British Pat. No. 1,173,123 published Sept. 4, 1969, suggests that other polyolefins such as polypropylene and polybutylene may also be used as the gel matrix, although no actual working examples of such gels are disclosed. However, Applicant's coworker John R. Rumierz has not found polypropylene or polybutylene polymers to be satisfactory for this purpose, but has discovered, as disclosed in his U.S. Pat. No. 4,146,487, referred to above, that polymethylpentene is superior to even polyethylene as a gel matrix for the lubricating oil. More specifically, the polyethylene gels useful in making the lubricating inserts of the present invention comprise from about 10 to less than about 95% by weight of a hydrocarbon oil of lubricating viscosity, from about 5 to about 90% by weight of polyethylene having an average molecular weight in the range from about 1.0 and preferably about 1.5 to about 5 million, in the form of a firm tough, solid gel having an oily surface as a result of oil exuding from the composition. For such gels to be sufficiently firm for use in the present invention, they must contain at least 5% by weight of the high molecular weight polyethylene; the remainder of the polyethylene content being made up by lower molecular weight polyethylene. It is preferred, however, that at least 25% by weight of the gel be composed of ultra high molecular weight polyethylene having an average weight above 1.0 million since this produces firm, tough gels. However, the inclusion of suitable proportions of polyethylene having a molecular weight of less than 1 million, preferably of the order of 20,000 to 50,000, improves the lubricant retaining and releasing characteristics of gels relying for their structure and firmness on the high molecular weight polyethylene. Suitable fillers such as nylon powder may be added to the gels to increase their dimensional stability.

Especially preferred gels are those described in Rumierz U.S. Pat. No. 4,146,487, which contain about 50 to 90% by weight of an oil of lubricating viscosity and about 50 to about 10% by weight of polymethylpentene having an average molecular weight from about 3 to about 5 million, in the form of a firm, tough, solid gel having an oily surface provided by oil exuding from the gel.

The lubricant inserts employed in the present invention are formed from the firm, tough, solid gels described above by any suitable shaping technique such as molding, casting, or machining or combinations of such operations, to provide inserts of the precise shape and size required to afford a predetermined fit in the bearing so that the oily surface of the lubricant inserts is in precise, predetermined contact with the surface to be lubricated, such as the desired portion of the bearing. The predetermined precision contact involves not only the precise area of the surface desired to be lubricated, but also the clearance between the solid gel and the surface, which is, of course, determined by the precise dimensions of the insert. In this way, the precision lubricant inserts of the present invention obviate the disadvantages of the previous use of such gels molded in situ in the void of the bearing, since such formed-in-place lubricating masses could not be controlled as to area and clearance from the contact surface and, indeed, in some cases added significantly to the bearing torque.

The invention will now be described in greater detail in conjunction with the accompanying drawings.

BRIEF DESCRIPTION OF THE DRAWINGS

FIG. 1 is a fragmentary side elevational view of a rolling bearing incorporating a lubricant insert in accordance with the present invention;

FIG. 2 is a sectional view through the bearing taken on the arcuate line 2—2 of FIG. 1;

FIGS. 3 and 4 are enlarged sectional views taken on lines 3—3 and 4—4 respectively of FIG. 1;

FIG. 5 is a fragmentary perspective view of a portion of the lubricant insert;

FIG. 6 is a fragmentary side elevational view of still another embodiment of lubricant insert for a rolling bearing in accordance with the present invention;

FIG. 7 is a view similar to FIG. 2 taken on the semicircular line 7—7 of FIG. 6;

FIGS. 8 and 9 are enlarged sectional views taken on lines 8—8 and 9—9 respectively of FIG. 6;

FIG. 10 is a fragmentary perspective view of the lubricant insert for the embodiment of rolling bearing illustrated in FIG. 6;

DESCRIPTION OF THE PREFERRED EMBODIMENTS

Figure 11:
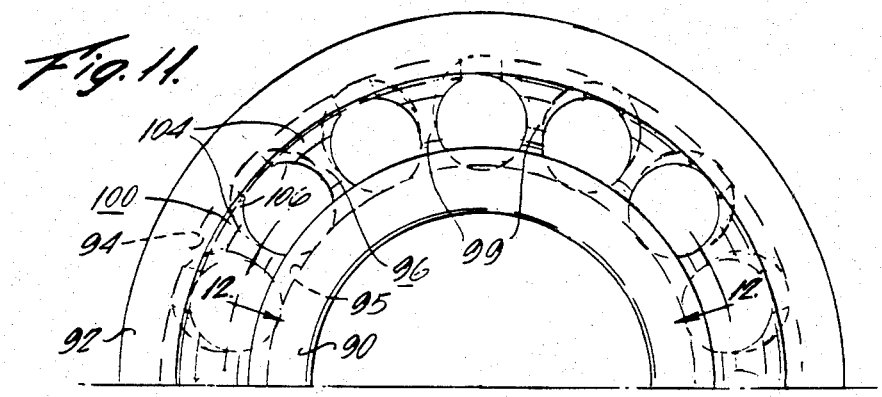
FIG. 11 is a fragmentary transverse sectional view of a spherical roller bearing incorporating a lubricant insert in accordance with the present invention.
Figure 12:
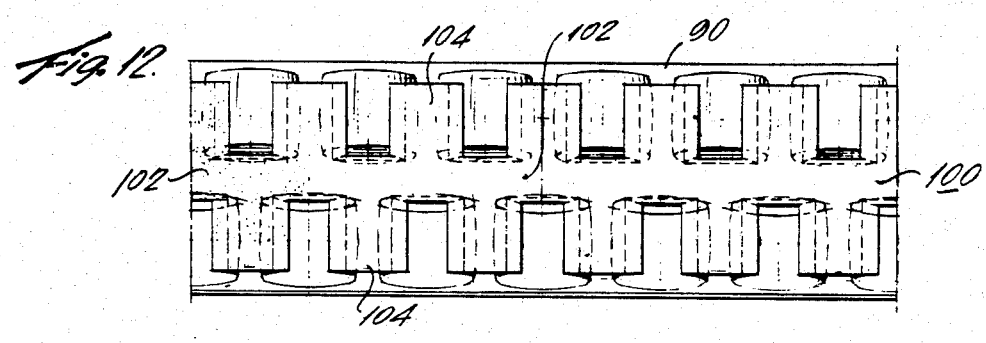
FIG. 12 is a fragmentary view with parts broken away taken on lines 12—12 of FIG. 11.
Figure 13:
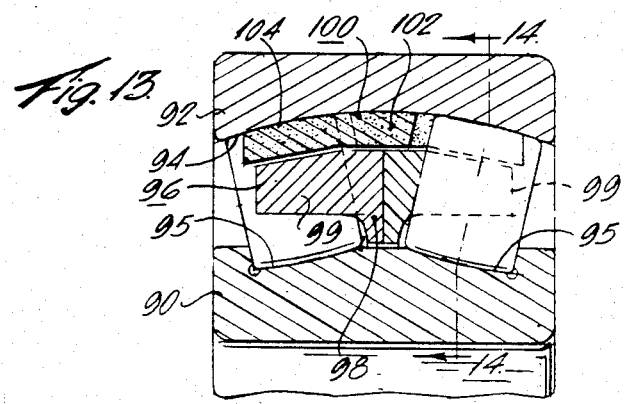
FIG. 13 is an enlarged transverse sectional view.
Figure 14:
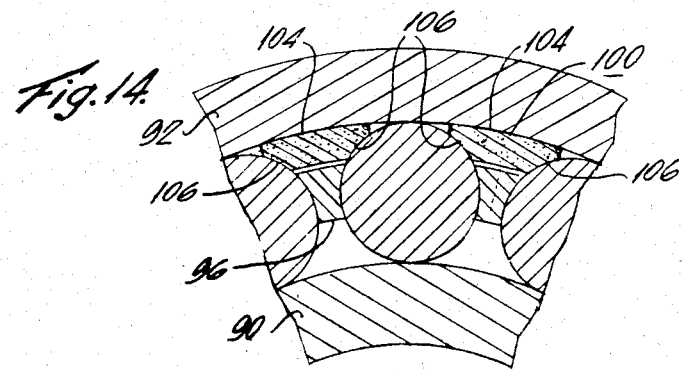
FIG. 14 is an enlarged sectional view taken on lines 14—14 of FIG. 13.

Referring now to the drawings and particularly to FIGS. 1-5 thereof, there is illustrated a conventional ball bearing generally designated by the numeral 10 and a lubricant insert 12 constructed in accordance with the present invention. The ball bearing assembly comprises the usual inner and outer rings 14 and 16 respectively which have confronting inner and outer raceways 18 and 20 and a plurality of balls 22 in the annular space between the rings which ride in the raceways. In the present instance the balls are circumferentially spaced by means of a cage 24. The cage 24 is of conventional design commonly referred to as a molded cage. The cage is made of a resilient plastic material and comprises a series of generally C-shaped members 26 which have an inner spherical contour complementing the balls to embrace the same, the C-shaped members 26 being interconnected by circumferentially spaced connecting bridges 28 along the transverse center plane of the bearing.

In accordance with the present invention, the lubricant insert 12 is of a predetermined configuration to permit easy and quick assembly to the fully assembled bearing and during operation is retained firmly in place in a manner to effectively lubricate the bearing without creating undue drag and is easily disassembled and replaced from time to time when necessary when the lubricant has been spent. The lubricant insert is composed of a firm, tough, solid gel matrix containing a lubricating oil of lubricating viscosity which exudes therefrom to provide an oily surface in contact with the ball bearing. The lubricant insert is of one-piece design and as illustrated comprises an annular ring member 30 of a predetermined radial height to span the annular gap between the raceways. A series of U-shaped locking tabs 32 project axially from the inner face of the annular member 30. The tabs 32 are circumferentially spaced and as illustrated in FIG. 2 straddle the cross webs of the cage. The axially projecting legs 34 of each locking tab are of a greater transverse dimension D than the radial height H between the land surfaces of the inner and outer rings and have outer contoured faces 36 which merge with the annular member 30 so that when the insert is seated, the contoured faces engage the outer edges of the raceways to lock the insert in place as illustrated in FIG. 4. The legs 34 are flexible to permit deflection inwardly toward one another to facilitate assembly of the insert in the bearing. The inner face 38 of the annular member 30 between each of the locking tabs is provided with a spherical seat or cut out 39 conforming to the contour of the balls. Note the legs 34 have shaped side edge portions forming a continuation of the spherical seat 39 to provide a large contact area conforming to the balls for good lubricant transfer. By this construction when the bearing is operating, the balls are rotating about their geometric center to pick up lubricant from the insert and deliver it to the contact zones in the raceways. Lubricant is also transferred to the raceways from the contoured faces 36. This is a continuous process during operation of the bearing to ensure continuous and effective lubrication of the critical contact areas.

There is illustrated in FIGS. 6-10 another embodiment of lubricant insert for a bearing assembly in the present instance also a ball bearing assembly. The bearing assembly generally designated by the numeral 40, similar to the previously described embodiment, includes inner and outer rings 42 and 44 respectively having confronting inner and outer raceways 45 and 46 and a plurality of balls 48 in the annular space between the raceways. A conventional cage 50 circumferentially spaces the balls. The cage 50 which in the trade is referred to as a two-piece riveted type cage is made, in the present instance, of metal and comprises two annular members 52 of serpentine configuration which as illustrated in FIG. 7 are joined by rivets 54 or the like at the transverse center plane of the bearing. The pockets 56 defined between the connecting bridges are contoured to the ball shape in the manner shown in FIG. 8.

In the present instance the lubricant insert 70 is of one-piece construction and includes an annular ring member 72 having a radial height $D_1$ slightly less than the radial distance $H_1$ between the confronting land surfaces of the inner and outer rings. Locking and lubricant transfer elements broadly designated by the numeral 73 project axially from the inner face of the annular member 72 to retain the insert in the locked position shown in FIGS. 7 and 9. More specifically, the locking members comprise a pair of flexible projections 74 and 76 extending from the outer side edges of the inner face of the annular member 172 which as illustrated have contoured outer surfaces defining ribs 78 and 80 which engage in the inner and outer raceway grooves respectively to seat the insert in the locked position. The feathered front edge permits flexing movement when the insert is initially positioned outboard of the annular groove between the rings for ease of assembly. A center projection 82 of shorter axial depth than the outer projections 74 and 76 is spaced from the flexible projections by grooves 84 and 86.

The insert configuration provides good transfer of lubricant to the balls and raceways during operation of the bearing. For example, faces 78a and 80a contact outer and inner raceways respectively. Face 72a contacts the ball above and below the cage as seen from FIG. 7. Lubricant migrates from the interior of the gel as a result of differential thermal expansion between the lubricant and the plastic thus wetting the surface of the plastic. Wherever the plastic makes contact with the raceways or rolling elements lubricant is transferred by wiping action-relative motion between plastic and bearing parts. Contact between plastic insert and bearing parts is the result of bearing motion and forces acting on the insert as a result of bearing motion such as centrifugal forces and gyroscopic forces.

There is illustrated in FIGS. 11-14 a still further embodiment of lubricant insert for bearing in accordance with the present invention. The bearing illustrated is a double-row spherical roller bearing comprising the usual inner and outer rings 90 and 92, the outer ring having a common spherical raceway 94 and the inner ring having a pair of raceways 95. The bearing further includes two rows of rollers in the annular space between the rings and a cage 96 for circumferentially spacing the rollers in each row. In the present instance the cage staggers the rollers of each row circumferentially and comprises essentially an annular ring-like central portion 98 and a plurality of axial extending elements 99 which define the pockets for the rolling elements.

In the present instance, the lubricant insert which is generally designated by the numeral 100 is an elongated strip which is formed to an annular shape so that the terminal ends abut. The strip has a central portion 102 and a series of axially directed wings 104 which project in opposite axial directions from the central portion 102 and, as illustrated, are circumferentially spaced apart. The wings projecting from one side of the central portion 102 are staggered in relation to the wings projecting from the opposite side so that the rollers in each row are circumferentially offset relative to one another in the manner shown in FIG. 12. Instead of a single strip material formed to an annular shape, the insert may comprise two or more generally C-shaped members which when assembled in the bearing have their terminal end portions abutting to form the annular insert of the type illustrated. The outer peripheral surface of the insert including the central portion 102 and wings 104 is spherical to match the spherical common outer raceway 94. Furthermore, the side edges of each of the wings are shaped as at 106 to conform to the peripheral shape to the rolling element with which they engage to transfer lubricant from the insert to the rolling elements during operation of the bearing.

In the operation of the bearing, the particular configuration of the lubricant insert provides continuous and adequate transfer of lubricant to the essential parts of the bearing in the following manner. Centrifugal force will cause the insert to be urged into contact with the spherical raceway 94, thereby effecting transfer of lubricant to the raceway. Note the contact between the outer peripheral surface of the roller and the side edges 106 transfer lubricant to the rollers and, of course, as the rollers rotate during operation of the bearing, the localized transfer of the lubricant to the rollers, lubricates both raceways.

Figure 15:
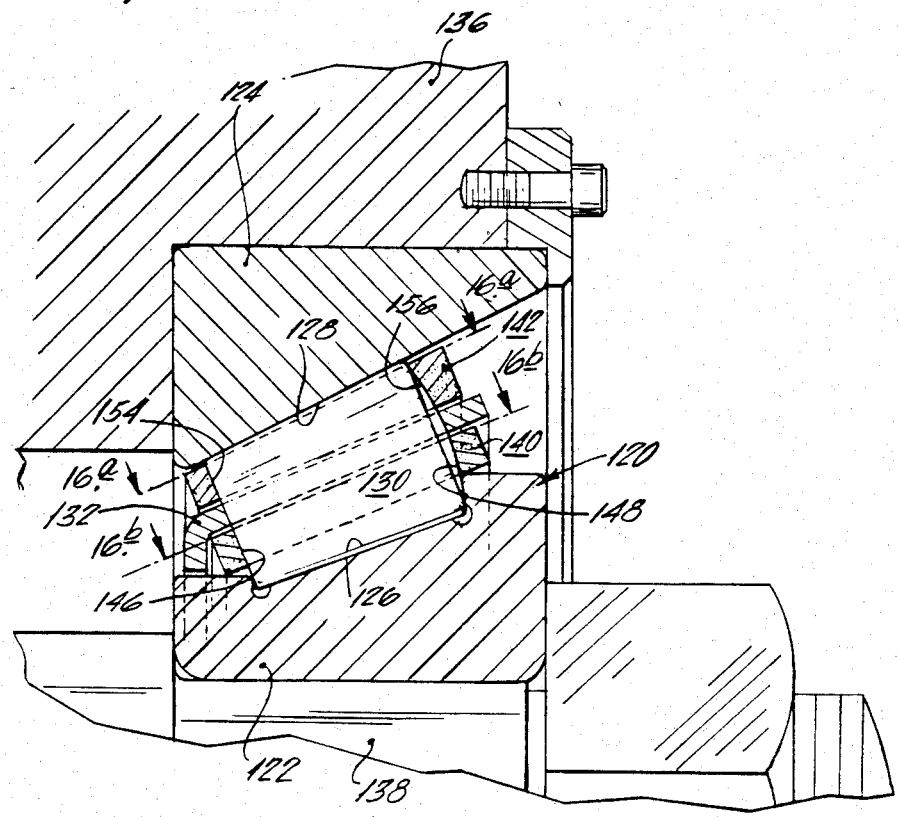
FIG. 15 is a sectional view of a still further embodiment of lubricant insert for a bearing assembly.
Figure 16A:
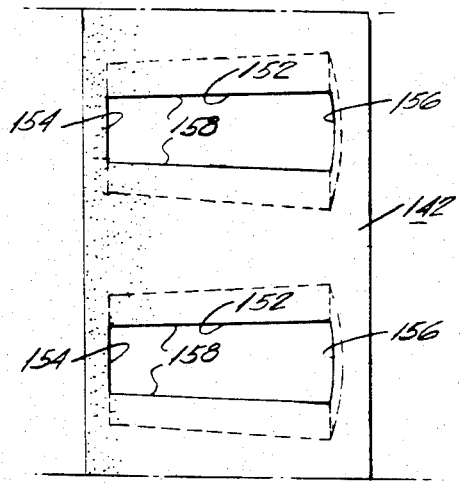
FIG. 16a is a fragmentary development of the upper lubricant insert taken on a plane 16a—16a of FIG. 15.
Figure 16B:
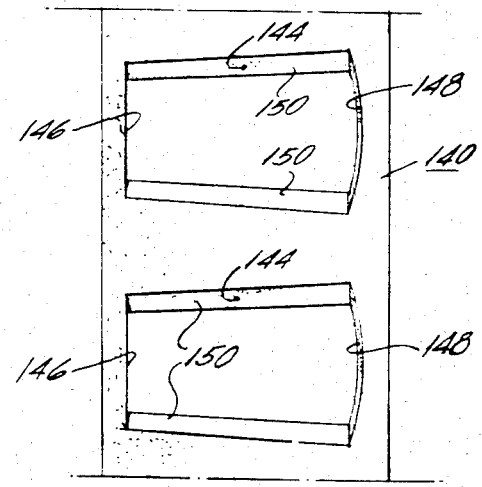
FIG. 16b is a fragmentary development of the lower lubricant insert taken on a plane 16b—16b of FIG. 15.

There is illustrated in FIGS. 15 and 16, a still further embodiment of lubricant insert in accordance with the present invention. The lubricant insert in this instance, is designed for a tapered roller bearing generally designated by the numeral 120. The tapered roller bearing is of generally conventional design and includes an inner ring 122 and an outer ring 124 each having confronting conical raceways 126, 128 and a plurality of conical rollers 130 in the annular space between the rings. A standard cage 132 having a series of circumferentially spaced pockets spaces the rolling elements. In the present instance, the outer ring 124 is mounted in a housing 136 or the like and the inner ring 122 is supported on a rotatable shaft member 138 engaged in the housing.

The lubricant inserts generally designated by the numerals 140 and 142 are composed of a firm, tough, solid gel matrix containing a lubricating oil of lubricant viscosity which exudes therefrom to provide an oily surface in contact with the bearing to lubricate the same. The lubricant insert in the present instance consists of two annular members 140 and 142 which are located on opposite sides of the cage 132. The inner insert 140 is of conical configuration and has a plurality of cut outs 144 therein which are circumferentially spaced and are of a size to totally embrace the rollers along the four side edges of each of the pockets. In this regard the wall 146 defining the short end of the pocket which confronts the small end of the rollers is a straight edge since this face of the roller is flat and the opposite wall 148 of the pocket is slightly contoured to blend with the sphered large end of the roller. The side edges 150 are slightly curved to conform to the contour of the roller. The outer insert 142 is of a similar configuration and includes a series of circumferentially spaced cut outs 152 wherein the end walls 154, 156 of the cut out conform closely to the shape of the ends of the rollers and the side edges 158 are also slightly curved to conform to the peripheral shape of the roller.

The inner ring, rollers, cage and inner lubricant insert are first assembled to form an integral sub-assembly. The conical outer insert is then moved into place, the resiliency of the material permitting the insert to be slipped over the rollers. The outer ring is then assembled and the bearing is completed. In the operation of the bearing, rotation of the rollers draws lubricant from the inserts and thus to the inner and outer raceways 126 and 128.

PREPARATION OF THE LUBRICATING GELS

The firm, tough, solid gel oil-exuding lubricating compositions from which the novel lubricant inserts are fashioned are prepared very simply by blending the polymer and lubricating oil components by conventional mixing techniques, heating the resulting mixture to a temperature somewhat above the initial softening point of the polymer for from about 3 minutes up to about 75 minutes depending on the polymer, and cooling the mixture to obtain the desired lubricating gel. For polyethylene gels heating at a temperature of about 160° C. (320° F.) to about 177° C. (350° F.) for about 3 minutes is sufficient. For polymethylpentene gels the mixture is heated to a temperature in the range from about 220° C. (428° F.) to about 260° C. (500° F.) for about 45 to about 75 minutes; the exact temperature being in the range from about 10° C. (18° F.) to about 50° C. (90° F.) above the initial softening temperature of the particular PMP polymer employed. The preparation of these gels is described in full detail in the Davis et al and Rumierz patents referred to above. Preferred procedures for the preparation of the gels are set forth in Examples 1–18 below.

POLYETHYLENE GELS

EXAMPLE 1

The mixture is prepared by combining 73% by weight Mobil SHC 629, a lubricating oil with viscosity of 160 mm² at 38° C. (100° F.) and 27% by weight ultra high molecular weight, polyethylene (molecular weight range of 4 to 4½ million) available from American Hoechst as Hostalen GUR 212. These materials are placed in a conventional mixer, for instance a Charles Ross Mfg. Co. mixer Model LDMY, and mixed until a homogeneous mass is obtained. This mixture is then charged into a mold and the mold is heated to 191° C. (375° F.) and held at that temperature for a period of one hour. The mold is then allowed to cool to ambient temperature and the insert is then removed from the mold. The bearing insert may also be prepared by charging the mold by use of an injection molding machine. In this method of preparation, the plastic/oil mix is injected into a mold at a temperature of 218° C. (425° F.).

These processes are operable for any composition between 50% oil and 50% plastic up to and including 90% oil and 10% plastic. Also, oils may be used in the range of 33 mm² at 38° C. up to and including 1210 mm² at 38° C.

Examples of suitable gels of the type described in Davis et al U.S. Pat. No. 3,547,819 are as follows:

EXAMPLE 2

35 grams of a polyethylene having a molecular weight of $1.5 \times 10^6$ to $2.5 \times 10^6$ were mixed with 65 grams of Harmony oil #44 (SAE #10) at room temperature. The mixture was poured into a mold and heated at 350° F. for 45 minutes in a forced air oven. The mold was then cooled to room temperature. The mixture in the mold had solidified to a tough, oil-dispensing, rigid composition.

EXAMPLE 3

67 grams of Harmony oil #44 (SAE #10 oil) and 33 grams of polyethylene having a molecular weight of $1.5 \times 10^6$ to $2.5 \times 10^6$ were mixed at room temperature. The mixture was poured into a mold and placed in a preheated forced air oven at 350° F. for 40 minutes. The mold was removed from the oven and cooled for 5 minutes at room temperature and quenched in a water bath. A gel composition was obtained and removed from the mold. The result was a smooth, tough, flexible and voidless composition which had assumed the shape of the mold.

EXAMPLE 4

75 grams of Security oil #53 (SAE #20 oil) and 25 grams of polyethylene having a molecular weight of $1.5 \times 10^6$ to $2.5 \times 10^6$ were mixed thoroughly and put in a forced air oven at 300° F. for 5 minutes. The mixture was then removed from the oven and cooled to room temperature. The result was a strong, uniform, solid product.

EXAMPLE 5

The procedure of Example 4 was followed except that the polyethylene had a molecular weight of $3 \times 10^6$. The result was substantially the same as that in Example 4.

The following example is illustrative of the rigid gel compositions of this invention containing a finely divided filler material which minimizes dimensional instability.

EXAMPLE 6

2 grams of a polyethylene having a molecular weight of $3 \times 10^6$, 75 grams of Security oil #53 (SAE #20 oil), 11 grams of a polyethylene having a molecular weight of $1.5 \times 10^6$ to $2.5 \times 10^6$ and 8 grams of a nylon powder were mixed. The mixture was heated to about 350° F. until a thick gel was formed. The gel was cooled until solidified at about 200° F. The gel was left set at room temperature for 6 months and no dimensional changes were observed.

For the purposes of illustration, there is set forth below compositions containing a low molecular weight polyethylene component in addition to the high molecular weight polyethylene component and lubricant component. It is noted that compositions of this type can be prepared according to any of the methods discussed above in connection with the two component composition, that is one containing lubricant and high molecular weight polyethylene components.

EXAMPLE 7

71.7 grams of Harmony oil #44 (SAE #10) and 0.7 gram of a polyethylene having a molecular weight of 23,000 were thoroughly mixed and heated until the polyethylene was dissolved in the oil. The mixture was cooled to room temperature and 27.6 grams of polyethylene having a molecular weight of $1.5 \times 10^6$ to $2.5 \times 10^6$ was added to and mixed thoroughly therewith. The result was a creamy, pourable and thick dispersion mixture suitable for molding and curing to form an element of the invention.

The next group of examples are illustrative of the rigid-like gel compositions of this invention.

EXAMPLE 8

75 grams of SAE #40 oil. 0.375 grams of a polyethylene having a molecular weight of 23,000, 0.375 gram of a polyethylene having a molecular weight of $1.5 \times 10^6$ to $2.5 \times 10^6$ and 8 grams of a dried nylon powder were mixed and heated to 300° F. while agitating the mixture. The heated mixture was cooled to about 200° F. and formed a fluid, weak gel product. At room temperature, 12 grams of the $1.5 \times 10^6$ to $2.5 \times 10^6$ molecular weight polyethylene were added to the fluid product and mixed thoroughly. The result was a creamy, pourable and thick dispersion mixture suitable for molding and curing to form an element of the invention.

EXAMPLE 9

81.7 grams of Harmony oil #44 (SAE #10) and 1.5 grams of a polyethylene having a molecular weight of 23,000 were mixed while heating to 200° F. The mixture was cooled to room temperature. To this cooled mixture, 8.4 grams of a nylon powder, and 8.4 grams of polyethylene having an average molecular weight of $1.5 \times 10^6$ to $2.5 \times 10^6$ were added and mixed thoroughly and heated to 350° F. for 15 minutes and then cooled slowly to room temperature. The product was a tough, strong solid. The product was aged for 6 months and the oil was still well retained therein.

EXAMPLE 10

99 grams of Security oil #53 (SAE #20), 0.5 gram of a polyethylene having a molecular weight of $1.5 \times 10^6$ to $2.5 \times 10^6$, and 0.5 gram of polyethylene having a molecular weight of 23,000 were mixed and heated. Upon cooling, the mixture formed a gel. There were mixed 75 grams of this gel with 12 grams of a polyethylene having a molecular weight of $1.5 \times 10^6$ to $2.5 \times 10^6$ and 13 grams of a nylon powder. The mixture was poured into a mold and then heated at 325° F. for 30 minutes. Upon cooling, the product was a tough, rigid gel.

EXAMPLE 11

99 grams of Harmony oil #44 (SAE #10), 0.5 gram of a polyethylene having a molecular weight of $1.5 \times 10^6$ to $2.5 \times 10^6$ and 0.5 gram of polyethylene having a molecular weight of 23,000 were mixed and heated to 300° F. Of the heated mixture 77.8 grams were cooled to room temperature and mixed with 13.4 grams of the polyethylene having molecular weight of $1.5 \times 10^6$ to $2.5 \times 10^6$, and 8.8 grams of a nylon powder. A dispersion mixture was obtained which was mixed thoroughly, poured into a mold and then heated to 300° F. for 60 minutes. Upon cooling, a rigid, homogeneous gel composition was produced in the shape of the mold which had no shrinkage after 6 months.

POLYMETHYLPENTENE GELS

EXAMPLE 12

To illustrate the preferred practice of the invention a shaped mass of lubricating gel was prepared containing 70% oil and 30% PMP (polymethylpentene) by weight of the total composition. More specifically 40 grams of PMP was mixed with 93 grams of lubricating oil in a conventional blender for about one minute until a homogeneous mixture was obtained. The PMP was in the form of a 60–120 mesh powder which is commercially available under the trade name "TPX Polymer" from Mitsui Petrochemical Industries, Mitsui & Company Incorporated. This PMP has an average molecular weight of 4 million. The oil was a synthetic hydrocarbon oil available from Mobil Oil Corporation under the trade name "SHC 624" and had a viscosity of 33 mm$^2$/s at 38° C. (100° F.).

After blending, the oil-PMP mixture was charged to a suitable mold with provision for heating, heated to 218° C. (425° F.) and maintained at that temperature for 60 minutes. The end is reached when the mixture becomes transparent and self-cohesive.

Heating was then discontinued and the mold and its contents allowed to cool to ambient temperature. When the mold was opened, a self-supporting, shaped mass of lubricating composition was obtained in the form of a firm, tough, solid gel having an oily surface caused by exudation of oil from the gel.

EXAMPLE 13

The general procedure of Example 12 was repeated with the exception that 10% PMP was mixed with 90% Mobil SHC 624. The resulting shaped lubricating gel mass was similar to that obtained in Example 12 but was much more flexible due to the decreased percentage of polymer present.

EXAMPLE 14

The general procedure of Example 13 was repeated with the exception that 50% PMP was mixed with 50% Mobil SHC 624. The cure temperature was again 218° C. (425° F.). However, the end point was not obtained until 180 minutes of cure. The resulting shaped lubricating gel mass was similar to that obtained in Example 12 but was much harder and less oil exuding. These effects are attributable to the increase in polymer content.

EXAMPLE 15

The general procedure of Example 14 was repeated with the exception that the cure was 232° C. (450° F.) for one hour. A similar lubricating gel mass was obtained. The reduction in curing time was related to the increase in curing temperature.

EXAMPLE 16

The general procedure of Example 12 was repeated using the same PMP but substituting Mobil "SHC 629" for the oil used previously. This oil differs primarily in having a viscosity of 160 mm$^2$/s at 38° C. (100° F.). No end point of the cure cycle was reached after 240 minutes using a 218° C. (425° F.) cure temperature. No shaped mass was formed. This is attributable to the greatly increased viscosity of the lubricant which hinders intimate mixing during the cure cycle at 218° C. (425° F.).

EXAMPLE 17

The general procedure of Example 16 was repeated except a cure temperature of 254° C. (490° F.) was employed. An end point was reached in 45–50 minutes. The resulting shaped lubricating gel was similar to that obtained in Example 12.

EXAMPLE 18

The general procedure of Example 12 was repeated with the exception that diester lubricant Exxon ETO 2380 was substituted for the previously used oil. The cure cycle was 252° C. (485° F.) for 60 minutes. The resultant shaped mass was obtained in the form of a tough, resilient solid gel with an oily surface caused by the exudation of oil from the gel.

What is claimed is:

1. A self supporting lubricant insert for a rolling bearing comprising inner and outer rings having confronting spaced raceways and a plurality of rolling elements in the annular space between the rings, said insert being composed of a firm, tough, solid gel matrix consisting of a polyolefin polymer containing a lubricating oil of lubricating viscosity which exudes therefrom to provide an oily surface in contact with the bearing elements which it engages, said lubricant insert adapted for easy assembly and removal from the bearing and comprising an annular member having a plurality of tabs contoured to the shape of the rolling elements and projecting axially from the inner face of the annular member to engage the rolling elements for effecting lubricant transfer and for detachably holding the insert in place in the bearing envelope, said axially projecting tabs are of a greater transverse dimension than the radial height between the land surfaces of the inner and outer rings and have outer contoured faces which merge with the annular ring member so that when the insert is seated, the contoured face engages the outer edge of the raceways to lock the insert in place.

2. A lubricant insert as claimed in claim 1 wherein the said annular member has a radial height slightly less than the radial distance between the confronting land surfaces of the inner and outer rings and a plurality of circumferentially spaced axially projecting locking and lubricant transfer elements, each locking member comprising a pair of flexible projections extending from the outer side edges of the inner face of the annular member having contoured outer surfaces defining ribs which engage in the inner and outer raceways to seat the insert in a locked position and a center projection of shorter axial depth.

3. A lubricant insert as claimed in claim 2 wherein the outer edge of the flexible projections is feathered to facilitate flexing movement when the insert is initially positioned outboard of the annular space between the rings for ease of assembly.

4. A lubricant insert as claimed in claim 2 wherein the outer surface including the central portion and wings is spherical to match the spherical common outer raceway.

5. A lubricant insert as claimed in claim 4 wherein side edges of each of the wings is shaped to comform to the peripheral shape of the rolling element with which they engage to transfer lubricant from the insert to the rolling elements during operation of the bearing.

* * * * *